US007489702B2

(12) United States Patent
Bi et al.

(10) Patent No.: US 7,489,702 B2
(45) Date of Patent: Feb. 10, 2009

(54) METHOD AND APPARATUS FOR INCREASING RADIO FREQUENCY EFFICIENCY FOR MIXED VOICE OVER INTERNET PROTOCOL AND DATA TRAFFIC

(75) Inventors: Qi Bi, Morris Plains, NJ (US); Yang Yang, Parsippany, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 527 days.

(21) Appl. No.: 11/095,924

(22) Filed: Mar. 31, 2005

(65) Prior Publication Data
US 2006/0221991 A1   Oct. 5, 2006

(51) Int. Cl.
*H04L 12/54* (2006.01)
(52) U.S. Cl. .................. 370/428; 370/351; 370/395.1; 370/395.4
(58) Field of Classification Search .......... 370/428, 370/351, 395.1, 395.4
See application file for complete search history.

(56) References Cited

U.S. PATENT DOCUMENTS

| 6,707,821 | B1 * | 3/2004 | Shaffer et al. | 370/395.4 |
| 6,721,334 | B1 * | 4/2004 | Ketcham | 370/473 |
| 2003/0210681 | A1 | 11/2003 | Sumi et al. | 370/352 |
| 2004/0085979 | A1 * | 5/2004 | Lee et al. | 370/412 |

FOREIGN PATENT DOCUMENTS

| EP | 1 443 733 A | 7/2004 |
| WO | WO 00 11849 | 3/2000 |

OTHER PUBLICATIONS

International PCT Search Report PCT/US2006/010259 dated Mar. 21, 2006.

* cited by examiner

*Primary Examiner*—Thomas Lee
*Assistant Examiner*—Jaweed A Abbaszadeh

(57) ABSTRACT

In one aspect of the instant invention, a method is provided for controlling a communications system in which VoIP traffic and data traffic are both provided. The method comprises receiving voice over internet protocol packets, accumulating a plurality of the voice over internet protocol packets, and transmitting the accumulated plurality of voice over internet protocol packets within a single time slot.

8 Claims, 3 Drawing Sheets

METHOD AND APPARATUS FOR INCREASING RADIO FREQUENCY EFFICIENCY FOR MIXED VOICE OVER INTERNET PROTOCOL AND DATA TRAFFIC

BACKGROUND OF THE INVENTION

1. Field of the Invention

This invention relates generally to telecommunications, and, more particularly, to wireless communications.

2. Description of the Related Art

In the field of wireless telecommunications, such as cellular telephony, a system typically includes a plurality of base stations distributed within an area to be serviced by the system. Various users within the area, fixed or mobile, may then access the system and, thus, other interconnected telecommunications systems, via one or more of the base stations. Typically, a mobile device maintains communications with the system as the mobile device passes through an area by communicating with one and then another base station, as the user moves. The mobile device 120 may communicate with the closest base station, the base station with the strongest signal, the base station with a capacity sufficient to accept communications, etc.

In some wireless systems, communications between the base stations and the mobile devices occur via a radio frequency (RF) system that uses dynamic Time Division Multiple Access (TDMA) to support multiple users via scheduling. That is, each of the multiple users is scheduled to transmit within a specified time slot. TDMA achieves high RF efficiency for general packet data services; however, when Voice over Internet Protocol (VoIP) service is introduced, it degrades the RF efficiency due to its small packet size, which often leads to a poor transport packing efficiency. Further, TDMA has a tight delay budget that also inhibits the RF system from exploiting multi-user diversity gain on the dynamic air interface.

One mechanism that has been employed to improve the VoIP transport efficiency is the use of header compression from source to destination. However, header compression does not address the issue of RF transport efficiency directly. For example, many wireless protocols employ physical framing structure with fixed time duration. Thus, even if the VoIP traffic is header compressed end-to-end, the transport efficiency over an air interface can still be rather poor.

On the RF side, a relatively new high-speed technology commonly referred to as Evolution Data Only (EVDO) attempts to alleviate the issue. EVDO (Rev. A) incorporates a capability of transmitting forward link packets addressed to multiple access terminals in a common time slot, which opens the door to improve the RF efficiency for VoIP transport. However, EVDO has some notable shortcomings. RF scheduler schemes employed in EVDO are not designed to optimize the RF efficiency in a mixed VoIP and data environment. For example, it has been shown the current EVDO Quality of Service (QoS) scheduler suffers a significance loss of RF efficiency once VoIP service is introduced into the system.

The present invention is directed to overcoming, or at least reducing, the effects of one or more of the problems set forth above.

SUMMARY OF THE INVENTION

In one aspect of the instant invention, a method is provided for controlling a communications system. The method comprises receiving latency sensitive packets, accumulating a plurality of the latency sensitive packets, and transmitting the accumulated plurality of latency sensitive packets within a single time slot.

In another aspect of the instant invention, a method is provided for controlling a communications system. The method comprises receiving voice over internet protocol packets, accumulating a plurality of the voice over internet protocol packets, and transmitting the accumulated plurality of voice over internet protocol packets within a single time slot.

BRIEF DESCRIPTION OF THE DRAWINGS

The invention may be understood by reference to the following description taken in conjunction with the accompanying drawings, in which like reference numerals identify like elements, and in which.

Figure 1:
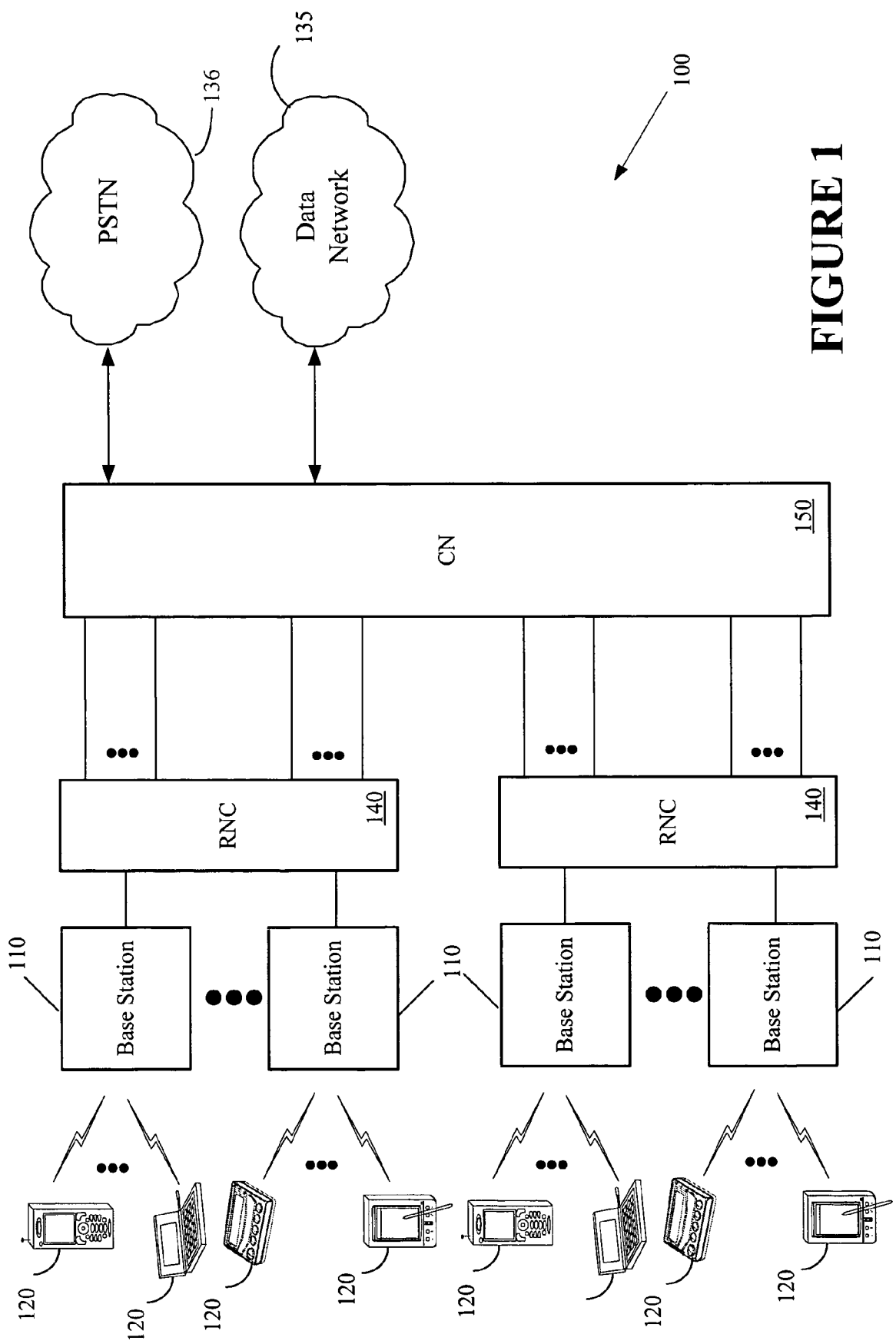
FIG. 1 is a block diagram of a communications system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

Generally, the instant invention is directed to an innovative RF scheduling scheme in a wireless telecommunications system. The RF scheduling scheme is intended to improve the VoIP performance together with the packet data throughput on the wireless or air interface. The system has traffic injection from VoIP and general packet data applications. The objective of the system is to deliver the VoIP, as well as the data packets, onto the air interface with joint improved performance on a user level, as well as a system aggregate level.

Turning now to the drawings, and specifically referring to FIG. 1, a communications system 100 is illustrated, in accordance with one embodiment of the present invention. For illustrative purposes, the communications system 100 of FIG. 1 is a Universal Mobile Telephone System (UMTS), although it should be understood that the present invention may be applicable to other systems that support data and/or voice communication. The communications system 100 allows one or more mobile devices 120 to communicate with a data network 135, such as the Internet, and/or a public telephone system (PSTN) 136 through one or more base stations 110. The mobile device 120 may take the form of any of a variety of devices, including cellular phones, personal digital assistants (PDAs), laptop computers, digital pagers, wireless cards, and any other device capable of accessing the data network 135 and/or the PSTN 136 through the base station 110.

In one embodiment, a plurality of the base stations 110 may be coupled to a Radio Network Controller (RNC) 140 by one or more connections, such as T1/E1 lines or circuits, ATM circuits, cables, optical digital subscriber lines (DSLs), Ethernet/GigabitEthernet links, and the like. Although two RNCs 140 are illustrated, those skilled in the art will appreciate that more RNCs 140 may be utilized to interface with a large number of base stations 110. Generally, the RNC 140 operates in coordination with the base stations 110 to which it is connected with the aid of agent software (not shown) in the RNC 140 and agent software (not shown) in the base station 110. The RNC 140 generally provides replication, communications, runtime, and system management services, and, may be involved in coordinating the transition of the mobile device 120 during transitions (e.g., soft handoffs) between the base stations 110. Although the instant invention is described below as being located, at least in part, in the base station 110, those skilled in the art will appreciate that some or all of the functionality attributed to the base stations 110 may be located in the RNC 140 without departing from the spirit and scope of the instant invention.

The RNCs 140 are also coupled to a Core Network (CN) 150 via a connection, which may take on any of a variety of forms, such as T1/E1 lines or circuits, ATM circuits, cables, optical digital subscriber lines (DSLs), Ethernet/GigabitEthernet links, and the like. Generally the CN 150 operates as an interface to the data network 135 and/or to the public telephone system (PSTN) 136. The CN 150 may perform a variety of functions and operations, such as user authentication, however, a detailed description of the structure and operation of the CN 150 is not necessary to an understanding and appreciation of the instant invention. Accordingly, to avoid unnecessarily obfuscating the instant invention, further details of the CN 150 are not presented herein. However, those skilled in the art will appreciate that some or all of the functionality attributed to the base stations 110 may be located in the CN 150 without departing from the spirit and scope of the instant invention.

Thus, those skilled in the art will appreciate that the communications system 100 enables the mobile devices 120 to communicate with the data network 135, the PSTN 136 and/or one another. It should be understood, however, that the configuration of the communications system 100 of FIG. 1 is exemplary in nature, and that fewer or additional components may be employed in other embodiments of the communications system 200 without departing from the spirit and scope of the instant invention.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Figure 2:
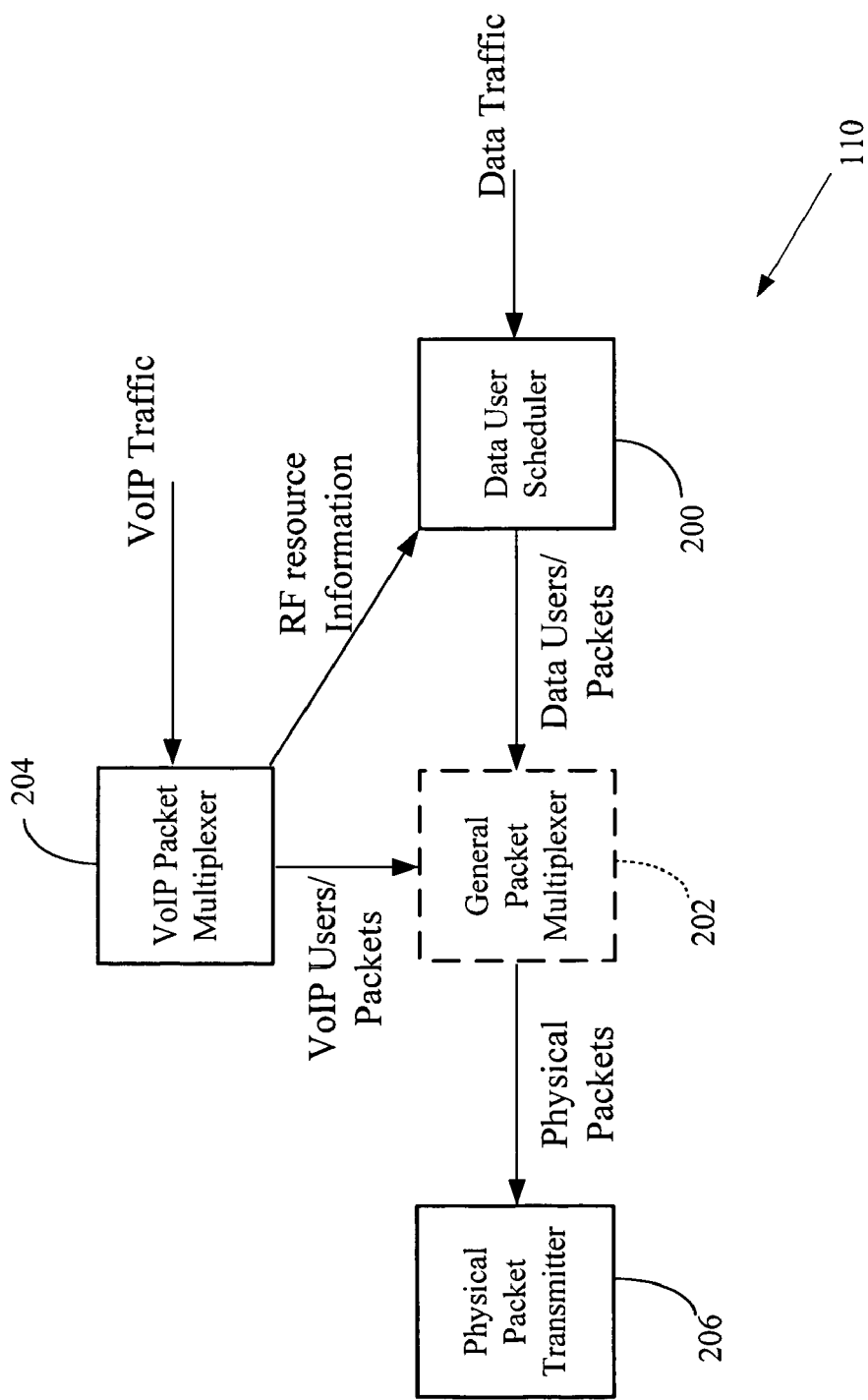
FIG. 2 is a block diagram of a portion of a base station that may be employed in the communications system of FIG. 1.

Turning now to FIG. 2, a block diagram of a portion of the base station 110 is shown. In particular, a portion of the base station 110 that is responsible for handling VoIP and Data traffic is depicted. Traffic arriving at the base station 110 from the RNCs 140 can be generally categorized as data traffic or VoIP traffic. Data traffic is delivered to a Data User Scheduler 200 that is generally responsible for assigning each of the received packets of data to a time slot in which it will be transmitted. The data packets are then delivered to a General Packet Multiplexer 202, which is used to coordinate the overall delivery of VoIP and Data packets to the mobile devices 120.

VoIP traffic is delivered to a VoIP packet multiplexer 204. The VoIP packet multiplexer 204 is generally responsible for controlling VoIP traffic. The VoIP multiplexer 204 accumulates VoIP packets and decides when to deliver them to the general packet multiplexer 202 based on pre-configured criteria. Generally, the VoIP packet multiplexer 204 accumulates one or more VoIP packets, and owing to their generally small size delivers a plurality of the VoIP packets to the general packet multiplexer to be transmitted in a single time slot. Any of a variety of pre-configured criteria may be used in determining how many of the VoIP packets may be placed into a single time slot without departing from the spirit and scope of the instant invention. For example, the following steps can compose a reasonable criteria: the number of accumulated VoIP packets reaches a maximum number of packets allowed by the system to be multiplexed on the same time slot; or alternatively, the latency experienced by the first arrived VoIP packet reaches a pre-defined latency threshold.

The VoIP packet multiplexer 204 also interacts with the Data User Scheduler 202. That is, the VoIP packet multiplexer 204 is responsible for establishing RF resource information (e.g., the maximum RF data rate constraint, the available RF resource left for other data, etc.) and providing the RF resource information to the Data User Scheduler 200. The Data User Scheduler 200 is configured to provide a conventional data scheduling function for general packet data services, and can use any of a variety of scheduler algorithms that may be selected by a designer of the communication system 100. Generally, when the VoIP packet multiplexer 204 has no traffic that is to be delivered to the mobile devices 120, the data user scheduler 200 has the entire RF resource to leverage. Such a situation may occur under at least two circumstances: when no VoIP traffic is being received; or when VoIP traffic is being received, but the VoIP packet multiplexer 204 is accumulating VoIP packets. However, when the VoIP packet multiplexer 204 is delivering VoIP packets to the General Packet Multiplexer 202, the Data User Scheduler 200 has only a portion of RF resource available to schedule under the constraints established by the VoIP packet multiplexer 204. The output of the Data User Scheduler 200 is the set of data user packets (if any) to the General Packet Multiplexer 202.

The General Packet Multiplexer 202 is generally responsible for combining the VoIP and data packets into a format suitable for physical layer transmission by a Physical Packet Transmitter 206. It is a design option to enable or disable such packet multiplexing crossing traffic flows of different QoS requirements.

In some communication technologies, such as Evolution Data Only (EVDO), a Hybrid-Acknowledgement Request (HARQ) technique is used. HARQ employs multi-time slot packet transmission. In such cases, if the system finds the time slot is occupied by an on-going transmission of packets that contains no VoIP traffic, and it has a new packet with VoIP traffic scheduled, it is an option to pre-empt the on-going transmission of the data packet in order to serve the VoIP packet. If pre-emption is permitted, the HARQ process of the data packet is halted, which may lead to the loss of the data packet, and upper-layer responsibility is left to cope with the packet loss.

The Physical Packet Transmitter 206 is generally responsible for the actual transmission of the physical packet in the context of the specific RF technology.

Conventional wireless scheduler schemes work on a single packet basis, and try to serve delay-sensitive traffic, such as VoIP as soon as possible in order to meet the stringent service latency requirement. The methodology of the instant invention, however, intentionally introduces latency for multiplexing so the scheduler decision is made on a multi-user packet basis. In TDM-based technology such as EVDO, where the time slot is the limiting RF resource, this extra latency actually reduces the total traffic latency experienced by the VoIP traffic as it substantially improves the RF efficiency of the time slot.

Meanwhile, the proposed method minimizes the time slot resource that the VoIP traffic occupies. Therefore, the time slots for other data traffic are maximized, which enables the exploitation of multi-user diversity gain by conventional scheduler schemes, such as proportional fair.

In summary, this invention provides a novel scheduler framework that jointly optimizes the performance of both VoIP and general packet data services. As a result, the overall RF efficiency is optimized as well.

Figure 3:
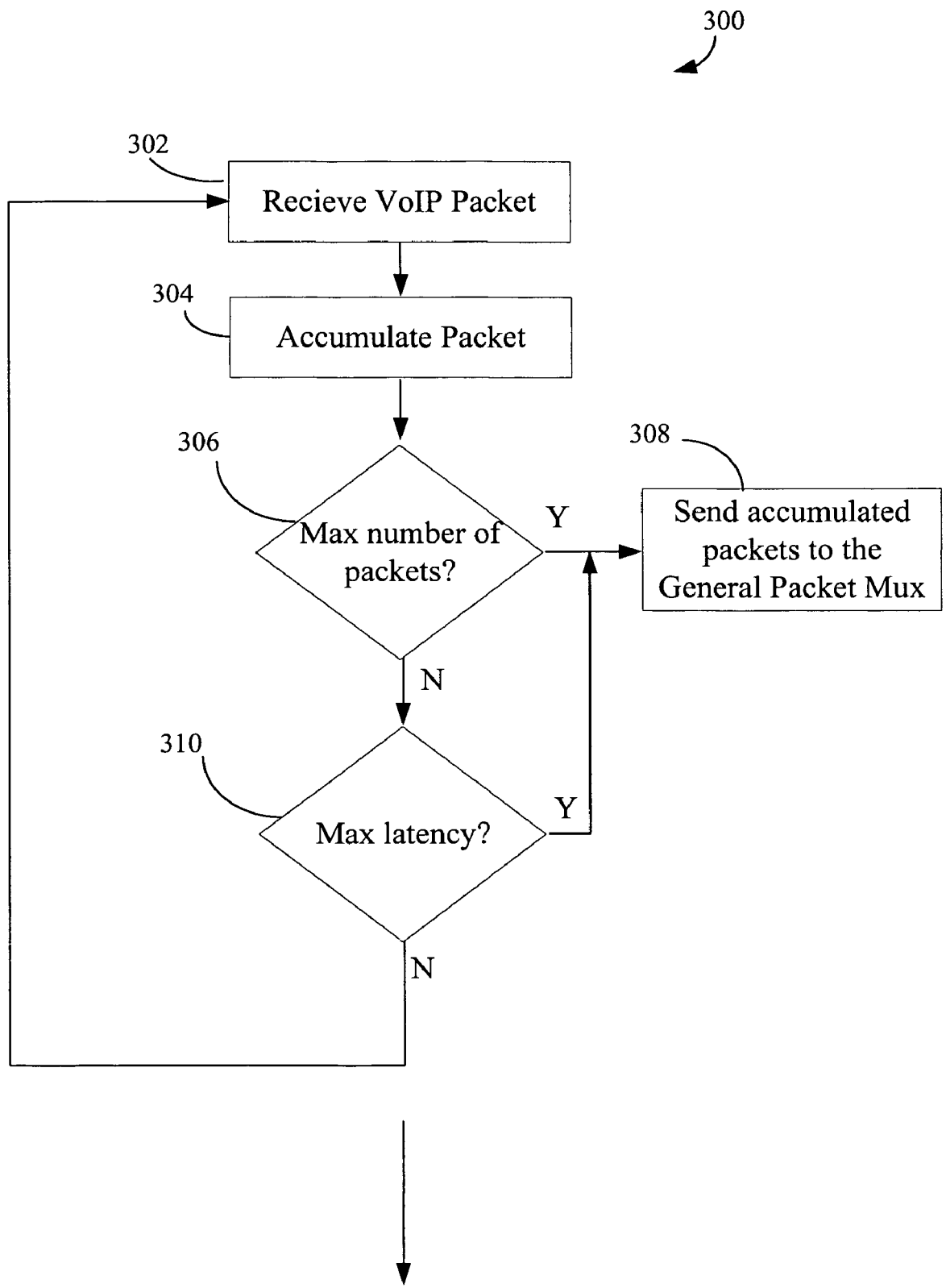
FIG. 3 is a stylistic flowchart representation of a process performed by base stations during a Voice over Internet Protocol (VoIP) communications session.

Turning to FIG. 3, a flowchart of one embodiment of a control scheme 300 that may be implemented in the VoIP Packet Multiplexer 204 is illustrated. The control scheme begins at block 302 with receipt of a VoIP packet. At block 304 the received VoIP packet is accumulated with any previously received, but as yet unsent, VoIP packets. At block 306, the control scheme 300 determines if a maximum number of packets have been accumulated. If so, control transfers to block 308 where the accumulated VoIP packets are delivered to the General Packet Multiplexer 202 so that the accumulated VoIP packets may be all transmitted in a single time slot. On the other hand, if the maximum number of VoIP packets has not yet been received, then control transfers to block 310, where the control scheme 300 checks to see if a maximum latency (for the oldest accumulated VoIP packet) has been achieved. If maximum latency has been reached, then control again transfers to block 308 where the accumulated VoIP packets are delivered to the General Packet Multiplexer 202. If neither maximum latency nor the maximum number of packets has been reached, then control returns to block 302 where another VoIP packet may be received by the VoIP packet multiplexer 204.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by the control units cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. Consequently, the method, system and portions thereof and of the described method and system may be implemented in different locations, such as the wireless unit, the base station, a base station controller and/or mobile switching center. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. It is therefore evident that the particular embodiments disclosed above may be altered or modified and all such variations are considered within the scope and spirit of the invention. Accordingly, the protection sought herein is as set forth in the claims below.

We claim:

1. A method implemented in a base station that supports radiofrequency transmission over an air interface in a plurality of time slots, the base station including a first multiplexer configured to form physical layer packets from received voice packets and data packets, a second multiplexer configured to receive voice packets, and a scheduler configured to receive data traffic, respectively, the method comprising:
   accumulating, at the second multiplexer, a plurality of voice packets;
   providing the accumulated plurality of voice packets to the first multiplexer; and
   forming, at the first multiplexer, at least one physical packet including the accumulated plurality of voice packets, said at least one physical packet being configured for transmission over the air interface in a single time slot.

2. The method set forth in claim 1, wherein accumulating the plurality of voice packets comprises accumulating the plurality of voice packets until a selected number of packets has been accumulated.

3. The method set forth in claim 1, wherein accumulating the plurality of voice packets comprises accumulating the plurality of voice packets for a duration determined based upon a latency associated with the plurality of voice packets.

4. The method set forth in claim 1, comprising providing information indicative of radiofrequency resources associated with the accumulated plurality of voice packets to the scheduler.

5. The method set forth in claim 4, comprising:
   receiving data traffic at the scheduler; and
   determining whether radiofrequency resources are available for transmission of the data traffic based upon the provided information indicative of radiofrequency resources associated with the accumulated plurality of voice packets.

6. The method set forth in claim 5, comprising providing at least one data packet to the first multiplexer when the radiofrequency resources are available for transmission of the data traffic.

7. The method set forth in claim 6, wherein forming said at least one physical packet comprises forming said at least one physical packet comprising the plurality of accumulated voice packets and said at least one provided data packet.

8. The method set forth in claim 1, comprising transmitting said at least one physical packet over the air interface in the single time slot.

* * * * *